United States Patent
Whelihan (10) Patent No.: US 9,965,564 B2
(45) Date of Patent: May 8, 2018

(54) APPARATUS AND METHOD OF DISPLAYING HARDWARE STATUS USING AUGMENTED REALITY

(75) Inventor: Michael L. Whelihan, Newport, RI (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days. days.

(21) Appl. No.: 13/190,688

(22) Filed: Jul. 26, 2011

(65) Prior Publication Data

US 2013/0026220 A1    Jan. 31, 2013

(51) Int. Cl.

| | |
|---|---|
| *G06F 17/00* | (2006.01) |
| *G06F 17/30* | (2006.01) |
| *G06Q 10/08* | (2012.01) |
| G06K 9/32 | (2006.01) |
| G06F 3/01 | (2006.01) |
| G06T 19/00 | (2011.01) |
| G06F 3/0481 | (2013.01) |

(Continued)

(52) U.S. Cl.
CPC ..... *G06F 17/30879* (2013.01); *G06Q 10/087* (2013.01); *G06F 3/011* (2013.01); *G06F 3/04815* (2013.01); *G06K 9/00671* (2013.01); *G06K 2009/3225* (2013.01); *G06K 2017/0045* (2013.01); *G06T 7/73* (2017.01); *G06T 19/006* (2013.01)

(58) Field of Classification Search
CPC ......... G06T 19/006; G06T 7/73; G06F 3/011; G06F 17/30879; G06F 3/04815; G06K 2017/0045; G06K 2009/3225; G06K 9/00671

USPC ................................. 235/375, 385
See application file for complete search history.

(56) References Cited

U.S. PATENT DOCUMENTS

| | | |
|---|---|---|
| 5,225,997 A | 7/1993 | Lederer et al. |
| 5,382,943 A | 1/1995 | Tanaka |

(Continued)

FOREIGN PATENT DOCUMENTS

| | | |
|---|---|---|
| EP | 2535781 A1 | 12/2012 |
| JP | 2013161395 A | 8/2013 |

(Continued)

OTHER PUBLICATIONS

Deffeyes, S. et al., "Augmented reality in the data center", 2010, ATN, vol. 1, No. 2.*

(Continued)

*Primary Examiner* — Christopher Stanford
(74) *Attorney, Agent, or Firm* — Lando & Anastasi, LLP (57) ABSTRACT

A method of accessing equipment status information in a data center includes detecting, by a mobile computing device, a fiduciary marker within at least one image captured by an image capture device, decoding the equipment identification data from the fiduciary marker, providing the equipment identification data to a data center management system for the data center through a communications network, receiving status information for the piece of equipment from the data center management system through the communication network, and displaying the status information on a display screen of the mobile computing device. The fiduciary marker is configured to contain encoded equipment identification data associated with a piece of equipment.

20 Claims, 5 Drawing Sheets

(51) Int. Cl.
  *G06K 17/00* (2006.01)
  *G06K 9/00* (2006.01)
  *G06T 7/73* (2017.01)

(56) References Cited

U.S. PATENT DOCUMENTS

| | | | |
|---|---|---|---|
| 5,388,032 | A | 2/1995 | Gill et al. |
| 5,400,246 | A | 3/1995 | Wilson et al. |
| 5,870,698 | A | 2/1999 | Riedel et al. |
| 5,959,275 | A * | 9/1999 | Hughes .............. G06K 17/0022 235/375 |
| 6,088,816 | A | 7/2000 | Noun et al. |
| 6,100,806 | A | 8/2000 | Gaukel |
| 6,278,479 | B1 * | 8/2001 | Wilson .................... G01S 5/163 348/47 |
| 6,281,790 | B1 | 8/2001 | Kimmel et al. |
| 6,396,534 | B1 | 5/2002 | Mahler et al. |
| 6,437,691 | B1 | 8/2002 | Sandelman et al. |
| 6,553,336 | B1 | 4/2003 | Johnson et al. |
| 6,611,866 | B1 | 8/2003 | Goldman |
| 6,714,977 | B1 | 3/2004 | Fowler et al. |
| 7,024,474 | B2 | 4/2006 | Clubb et al. |
| 7,372,451 | B2 * | 5/2008 | Dempski .............. G02B 27/017 345/158 |
| 7,456,736 | B2 | 11/2008 | Primm et al. |
| 7,506,264 | B2 * | 3/2009 | Polan .................. H04L 41/0273 709/208 |
| 7,519,909 | B2 | 4/2009 | Kuiawa et al. |
| 7,529,387 | B2 * | 5/2009 | Kotake .................... G06K 9/32 382/103 |
| 7,561,717 | B2 * | 7/2009 | Anderson ..................... 382/101 |
| 9,639,984 | B2 | 5/2017 | Mullins |
| 2001/0047410 | A1 | 11/2001 | Defosse |
| 2002/0043969 | A1 | 4/2002 | Duncan et al. |
| 2002/0071031 | A1 | 6/2002 | Lord et al. |
| 2002/0161885 | A1 | 10/2002 | Childers et al. |
| 2003/0011647 | A1 | 1/2003 | Abbondanzio et al. |
| 2003/0033550 | A1 | 2/2003 | Kuiawa et al. |
| 2003/0090503 | A1 | 5/2003 | Leapman |
| 2004/0160897 | A1 | 8/2004 | Fowler et al. |
| 2004/0163102 | A1 | 8/2004 | Fowler et al. |
| 2005/0071093 | A1 | 3/2005 | Stefan |
| 2005/0071444 | A1 | 3/2005 | Motoyama |
| 2005/0242189 | A1 * | 11/2005 | Rohs ...................... 235/462.46 |
| 2005/0246436 | A1 | 11/2005 | Day et al. |
| 2005/0276444 | A1 * | 12/2005 | Zhou .................. G06F 3/04815 382/103 |
| 2006/0028488 | A1 | 2/2006 | Gabay et al. |
| 2006/0038833 | A1 * | 2/2006 | Mallinson et al. ........... 345/633 |
| 2006/0238339 | A1 | 10/2006 | Primm et al. |
| 2007/0030824 | A1 | 2/2007 | Ribaudo et al. |
| 2007/0088823 | A1 | 4/2007 | Fowler et al. |
| 2007/0092161 | A1 * | 4/2007 | Aratani .................... G06T 7/73 382/286 |
| 2007/0287473 | A1 | 12/2007 | Dupray |
| 2008/0215727 | A1 | 9/2008 | Denis et al. |
| 2008/0263150 | A1 | 10/2008 | Childers et al. |
| 2008/0317021 | A1 | 12/2008 | Ives et al. |
| 2009/0113323 | A1 | 4/2009 | Zhao et al. |
| 2009/0121860 | A1 | 5/2009 | Kimmel et al. |
| 2010/0150425 | A1 | 6/2010 | Kalteis |
| 2011/0037712 | A1 | 2/2011 | Kim et al. |
| 2011/0138416 | A1 | 6/2011 | Kang et al. |
| 2011/0138444 | A1 | 6/2011 | Kang et al. |
| 2011/0191454 | A1 | 8/2011 | Joukov |
| 2011/0218730 | A1 * | 9/2011 | Rider et al. ..................... 701/201 |
| 2011/0241833 | A1 * | 10/2011 | Martin et al. ................. 340/10.1 |
| 2012/0026530 | A1 * | 2/2012 | Tsongas et al. ............. 358/1.14 |
| 2012/0075343 | A1 | 3/2012 | Chen |
| 2012/0236161 | A1 | 9/2012 | Kwon et al. |
| 2012/0243743 | A1 | 9/2012 | Pastor et al. |
| 2012/0249588 | A1 * | 10/2012 | Tison .................... G06F 1/1696 345/633 |
| 2012/0313963 | A1 * | 12/2012 | Chen-Quee .......... G06Q 10/087 345/593 |
| 2013/0024785 | A1 | 1/2013 | Van Wie |
| 2013/0031202 | A1 | 1/2013 | Mick et al. |
| 2013/0038633 | A1 | 2/2013 | Maggiore |
| 2013/0069985 | A1 | 3/2013 | Wong et al. |
| 2013/0120449 | A1 * | 5/2013 | Ihara .................. G06F 11/0727 345/633 |
| 2013/0162632 | A1 | 6/2013 | Varga et al. |
| 2013/0169681 | A1 | 7/2013 | Rasane et al. |
| 2014/0028712 | A1 | 1/2014 | Keating et al. |
| 2014/0147021 | A1 | 5/2014 | Wang et al. |
| 2014/0203071 | A1 | 7/2014 | Eggert |
| 2014/0270477 | A1 | 9/2014 | Coon |
| 2015/0043887 | A1 | 2/2015 | Gurudoss et al. |
| 2015/0187137 | A1 | 7/2015 | Mullins |
| 2015/0213325 | A1 | 7/2015 | Krishnamoorthi et al. |
| 2015/0302650 | A1 | 10/2015 | Abdelmoati et al. |
| 2015/0325047 | A1 | 11/2015 | Conner et al. |
| 2016/0327293 | A1 | 11/2016 | Grabowski et al. |

FOREIGN PATENT DOCUMENTS

| | | |
|---|---|---|
| WO | 2007066166 A1 | 6/2007 |
| WO | 2013136295 A1 | 9/2013 |
| WO | 2015047411 A1 | 5/2015 |

OTHER PUBLICATIONS

Extended European Search Report from corresponding EP Application No. 15183657.4 dated Feb. 17, 2016.

* cited by examiner

APPARATUS AND METHOD OF DISPLAYING HARDWARE STATUS USING AUGMENTED REALITY

BACKGROUND

Centralized data centers are facilities for maintaining information technology (IT) infrastructures, which include computers, communications, and other electronic equipment. The IT infrastructure may also include power supplies for powering the equipment, environmental controls for cooling the equipment and power supplies, and security systems for protecting the equipment. Specialized systems called data center managers or data center management systems are used by data center operations personnel to centrally—and to some extent, automatically—monitor and control the data center infrastructure in real-time. A central server communicates with the various other devices over a communications network to collect operational data, issue commands, and manage inventory, among other functions.

Operations personnel typically interact with the data center manager using a client device, such as a personal computer connected to the data center manager. The client runs software that is configured to provide a user interface to the data center manager. Typically, the client user interface enables the user to monitor the status of many pieces of equipment within the data center. However, this requires that each piece of equipment be named or otherwise identified in a human-readable manner that allows the user to distinguish one piece of equipment from another and know where each piece of equipment is physically located within the data center.

SUMMARY

According to one embodiment, a method of accessing equipment status information in a data center includes detecting, by a mobile computing device, a fiduciary marker within at least one image captured by an image capture device, decoding the equipment identification data from the fiduciary marker, providing the equipment identification data to a data center management system for the data center through a communications network, receiving status information for the piece of equipment from the data center management system through the communication network, and displaying the status information on a display screen of the mobile computing device. The fiduciary marker is configured to contain encoded equipment identification data associated with a piece of equipment. In another embodiment, the fiduciary marker may include a two-dimensional barcode.

In another embodiment, displaying the status information may include superimposing the status information upon the at least one image.

In another embodiment, the method may include sending, by the mobile computing device and through the communication network, a control command to the piece of equipment through the data center management system.

In another embodiment, the equipment identification data may include an Internet Protocol (IP) address of the piece of equipment, a serial number of the piece of equipment, a Media Access Control (MAC) address of the piece of equipment, a hostname associated with the piece of equipment, a model number of the piece of equipment, and/or a location of the piece of equipment.

In another embodiment, the status information may include an alert message, an alarm message, a sensor value, and/or a group name.

In another embodiment, the image may be a live video feed or a series of images.

According to one embodiment, an apparatus for accessing equipment status information in a data center includes a camera and a mobile computing device. The mobile computing device has a processor, a display screen and a wireless communication unit. The mobile computing device is coupled to the camera and configured to receive at least one image captured by the camera. The processor is configured to detect a fiduciary marker within the at least one image. The fiduciary marker is configured to contain encoded equipment identification data associated with a piece of equipment in the data center. The processor is further configured to decode the equipment identification data from the fiduciary marker, send the equipment identification data to a data center management system for the data center using the wireless communication unit, receive status information for the piece of equipment from the data center management system using the wireless communication unit, and display the status information on the display screen. In another embodiment, the fiduciary marker may include a two-dimensional barcode.

In another embodiment, the processor may be configured to display the status information superimposed upon the at least one image. In yet another embodiment, the processor may be configured to send a control command to the piece of equipment through the data center management system using the wireless communication unit.

In another embodiment, the equipment identification data may include an Internet Protocol (IP) address of the piece of equipment, a serial number of the piece of equipment, a Media Access Control (MAC) address of the piece of equipment, a hostname associated with the piece of equipment, a model number of the piece of equipment, and.or a location of the piece of equipment.

In another embodiment, the status information may include an alert message, an alarm message, a sensor value, and/or a group name.

According to one embodiment, a computer readable medium includes computer-executable instructions that when executed on a processor perform the acts of detecting, within a data center, a fiduciary marker within at least one image captured by an image capture device coupled to the processor, decoding the equipment identification data from the fiduciary marker, providing the equipment identification data to a data center management system for the data center through a communications network, receiving status information for the piece of equipment from the data center management system through the communication network, and displaying the status information on a display screen coupled to the processor. In one embodiment, the fiduciary marker may be configured to contain encoded equipment identification data associated with a piece of equipment.

According to another embodiment, the fiduciary marker may include a two-dimensional barcode having hardware identification data encoded therein.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Embodiments of the invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various embodiments of the present invention are directed to methods and apparatuses for monitoring and/or controlling pieces of equipment, such as hardware devices in a data center, using a mobile computing device, such as a smart phone with a built-in camera. In at least one embodiment, a one- or two-dimensional barcode is affixed on or near each piece of hardware. The barcode includes encoded identifying information for the associated hardware, such as an Internet Protocol (IP) address, serial number, Media Access Control (MAC) address, hostname, model number, location, or other identifying information. Using the camera of the mobile computing device, a user captures an image of the barcode. The mobile computing device detects the barcode within the image, decodes the identifying information in the barcode, and sends the identifying information to a data center management system (e.g., wirelessly). In response, the data center management system returns to the mobile computing device status information for the corresponding hardware device. The status information is then displayed on the screen of the mobile computing device, for example, in an augmented reality scheme where the status is superimposed over the image as captured by the camera. Thus, a user can walk from one hardware device to another with, for example, a smart phone in hand, and retrieve the status of any piece of equipment simply by capturing images of the barcode for each device.

Augmented reality techniques for providing a computer user or television viewer with an indirect view of a real-world environment whose elements are augmented by computer-generated sensor input, such as sound, graphics, or tactile feedback may be used in some embodiments. In one example, a user of a video-enabled device can view, either locally or remotely, the environment as captured by a camera. The video display may include supplemental text or graphics that relate to one or more objects within the user's view but do not exist physically in the environment. The artificial "first down" line that appears in American football telecasts is one example of augmented reality, since the line as it appears on television does not actually exist on the football field.

Two-dimensional barcodes may be used in some embodiments. One example of a two-dimensional barcode is the Quick Response (QR) code developed by Denso Wave Inc. of Chita-gun, Aichi, Japan. QR codes are an improvement over conventional one-dimensional bar codes because more data can be encoded in the pattern over a two-dimensional surface. Among other fields, QR codes are widely used in industrial management, such as for asset identification and inventory management. Typically, a fiduciary marker, or fiducial, having a two-dimensional barcode is photographed by a camera, and the data in the barcode is then extracted from the image by a compatible device. Several existing open-source toolkits for augmented reality and analyzing fiduciary markers, such as ARToolKit, ARToolKitPlus, and ZXing, may be used in conjunction with various embodiments. Fiduciary markers are not limited to two-dimensional barcodes.

Figure 1:
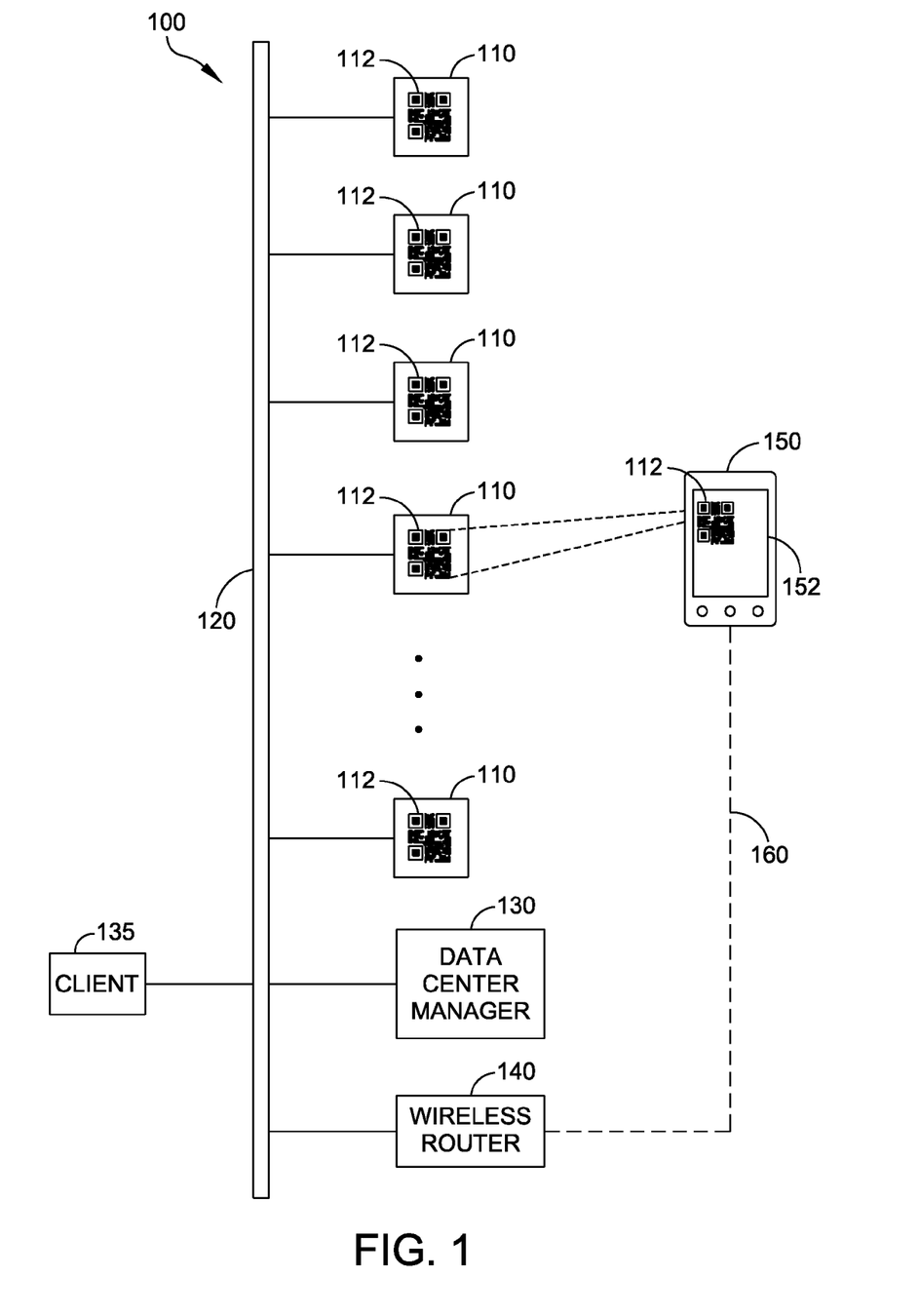
FIG. 1 is a functional block diagram of an exemplary hardware device management system in accordance with one embodiment.

FIG. 1 is a functional block diagram of an exemplary hardware device management system 100 according to one embodiment. One or more hardware devices 110 within a data center are interconnected through a network 120, such as an Ethernet network, to a data center manager 130. A wireless router 140 is connected to the network 120. The hardware devices 110 may include, for example, devices that can be remotely monitored and/or controlled over the network 120, such as servers, uninterruptible power supplies, routers, cooling systems, lighting, or other types of devices typically found in a data center environment. It should be understood that hardware devices 110 may include virtual devices, such as hardware emulated by software running on another computer, or logical groups of devices, such as server farms or disk arrays.

In one example, the data center manager 130 is a computer running software configured to control, monitor, and manage each of the hardware devices 110. Such software may, for example, perform one or more of the following monitoring and automation functions: alarming and notification, control, status, visualization, configuration, reporting and analytics. One exemplary data center manager 130 includes InfraStruxure Central sold by American Power Conversion Corporation of West Kingston, R.I. It should be understood that the data center manager 130 may perform other functions, such as data collection/gathering, resource planning/allocation, and/or implementation (e.g., change tracking, inventory tracking, dependency analysis, prediction and modeling), and that other systems may be used to perform one or more of these functions.

An optional client 135 communicates with and serves as a front-end user interface for the data center manager 130. For example, the client 135 may be a conventional personal computer (PC) connected to the network 120. The client 135 may run software (e.g., a web server or custom application) that is configured to provide a user with a graphical user interface (GUI) that enables the user to view alarms, warnings, and other messages pertaining one or more of the hardware devices 110. In another example, the client 135 may enable the user to control one or more of the hardware devices 110 through the data center manager 130.

Although the conventional client 135 is useful, it typically requires the user to travel to a certain place where the client is physically installed, thus limiting its usefulness in large or distributed data center environments where the client 135 may be far away from some of the hardware devices 110. For example, if the user of the data center manager 130 wants to check the status of one of the hardware devices 110, he or she may have to walk to the hardware device 110, retrieve an identification number from the device, and then return to the client 135 to search for the status information using the identification number. In some circumstances, the hardware devices 110 may not be adequately or properly labeled with identification information, making it more difficult for the user to check on such devices using the data center manager 130. In another example, the client 135 may provide status information for dozens, if not hundreds, of hardware devices 110, many of which may be similar in function and/or location. This makes it more difficult for the user to quickly locate status information for one hardware device 110 of interest.

According to one embodiment, a fiduciary marker 112, such as a one- or two-dimensional barcode, is affixed on or near each hardware device 110. In one embodiment, the fiduciary marker 112 is a QR code, although any type of fiduciary marker may be used. The fiduciary marker 112 is generated in advance (e.g., when the hardware device 110 is installed or inventoried) and includes encoded identifying information for the associated hardware, such as an Internet Protocol (IP) address, serial number, Media Access Control (MAC) address, hostname, model number, location, or other identifying information. Each fiduciary marker 112 may be unique so that no two are the same within the data center and each represents a different hardware device 110. The fiduciary marker 112 may be affixed, for example, to the faceplate of the hardware device 110, on an equipment rack containing the hardware device, or in another suitable location where the marker can be readily observed by a person standing near the device. The fiduciary marker 112 does not need to be affixed directly to the hardware device 110. In some embodiments, the fiduciary marker 112 may be included on a tag attached to the hardware device 110 or on mounting hardware near the device.

Figure 2:
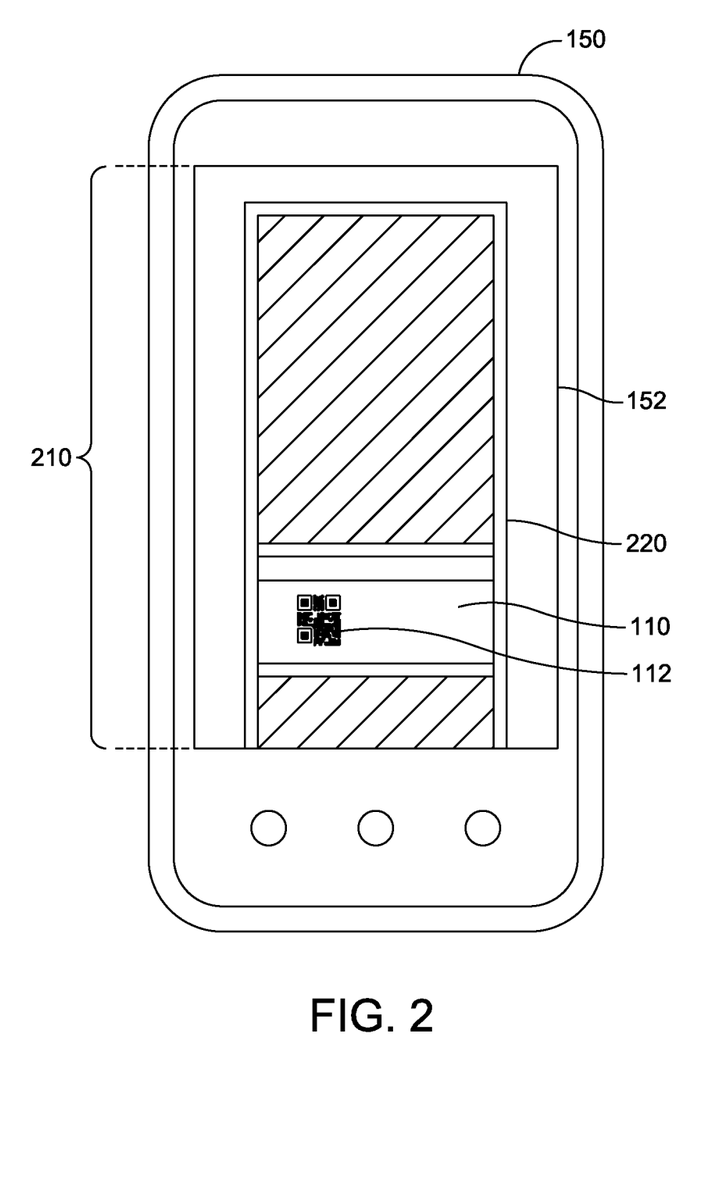
FIG. 2 illustrates an exemplary image displayed on a mobile computing device of one embodiment.

FIG. 2 illustrates a mobile computing device 150 with a built-in digital camera (not shown) and display 152, such as an iPhone by Apple Inc. of Cupertino, Calif. According to one embodiment, a user carrying the mobile computing device 150 may approach the hardware device 110 of FIG. 1 and capture an image of the fiduciary marker 112 with the camera. The captured image, including the fiduciary marker 112 and any other objects in the field of view of the camera, may be displayed on the display 152. For example, multiple hardware devices and/or multiple markers may appear within the captured image. One example image, indicated at 210, is shown in FIG. 2. In addition to the fiduciary marker 112 (in this example, a QR code), the example image 210 includes an equipment rack 220 housing one hardware device 110. The image may be, for example, a snapshot, a series of snapshots, or a live video feed.

In one embodiment, the mobile computing device 150 includes software for scanning and decoding the fiduciary marker 112 using conventional techniques. For QR codes, such software is widely available for several mobile operating system platforms, including, for example, iOS by Apple Inc., Blackberry® OS by Research in Motion of Waterloo, Ontario, Canada, and the open-source Android operating system developed in part by Google Inc. of Mountain View, Calif.

The scanning/decoding software is configured to detect at least one fiduciary marker 112 anywhere within the captured image and to decode identifying information encoded within the marker(s). The identifying information may contain, for example, an IP address of the hardware device 110 (e.g., 10.218.10.125). Subsequent to decoding the identifying information, the identifying information is sent wirelessly to the data center manager 130 through the wireless router 140 shown in FIG. 1 and indicated at 160. Communications between the mobile computing device 150 and the wireless router 140 may be, for example, performed using a Wi-Fi™, 3G, 4G or other wireless data communications standard. In another embodiment, the captured image is also sent to the data center manager 130. The data center manager 130 may maintain a database of images associated with various pieces of equipment in the data center. The images may be retrieved from the database to provide a visual reference for the equipment.

Figure 3A:
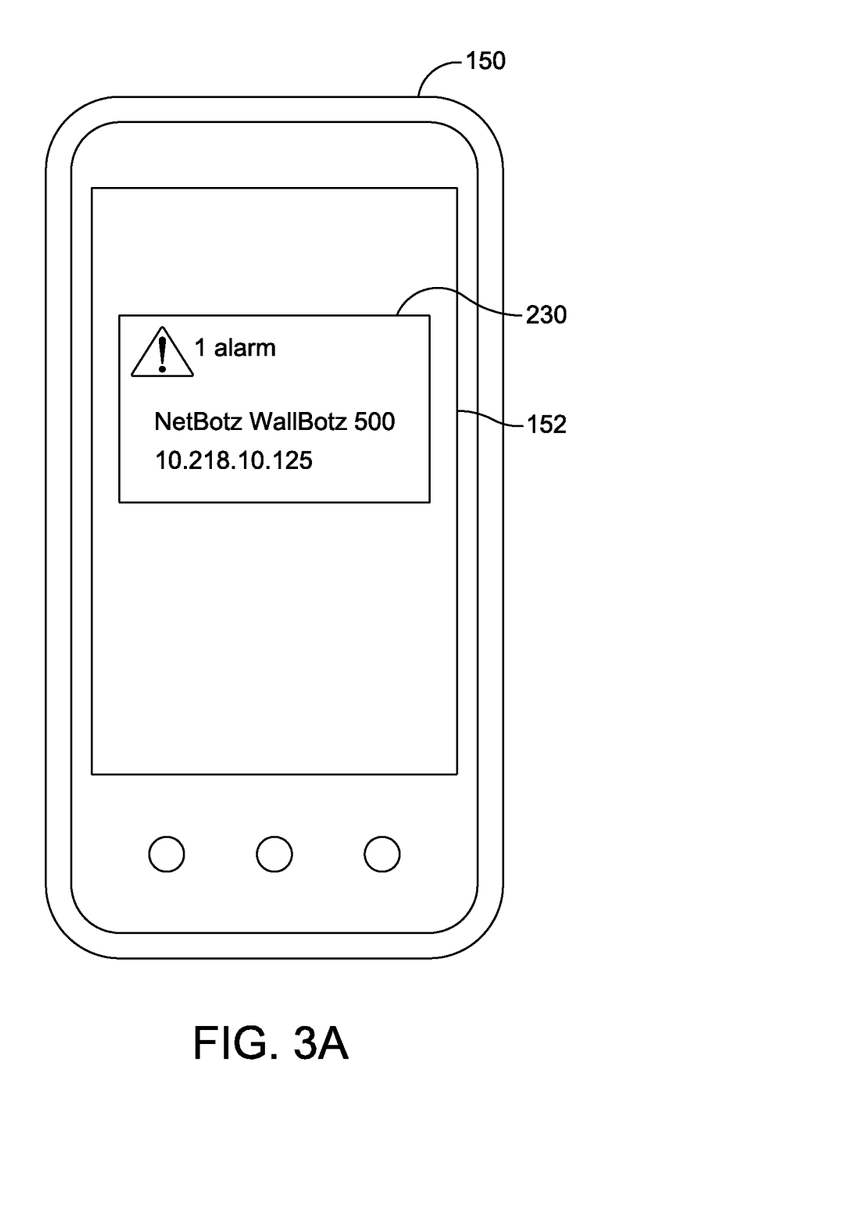
FIG. 3A illustrates another exemplary image displayed on the mobile computing device of FIG. 2.

Once the identifying information is received by the data center manager 130, status information relating the corresponding hardware device 110 is returned to the mobile computing device 150 over the wireless connection 160. Referring now to FIG. 3A, in one embodiment, the status information is displayed on the screen 152, as indicated at 210. The status 230 may include, for example, an indication that there is an alarm active for the hardware device 110, identifying information for the hardware device (such as name, address, model number, and/or version number) or other status information. In another embodiment, the user may select the status 230 (e.g., by touching it or clicking on it) to display more detailed information.

In one embodiment, the mobile computing device 150 includes client software for interacting with the data center manager 130. The client software enables, among other things, the user to log into the data center manager 130 with user credentials (e.g., username and password) and authenticate the mobile computing device 150 for security purposes. The client software may optionally include a simplified interface, as compared to the software running on the client 135, to accommodate the limited display 152 size and processing power of the mobile computing device 150. For example, the interface may be text-only and/or limited to several lines of information. In particular, the simplified interface may be configured to display status information for one piece of equipment at a time. In another example, the interface may include graphics and/or buttons for enabling the user to view and/or interact with the interface.

Figure 3B:
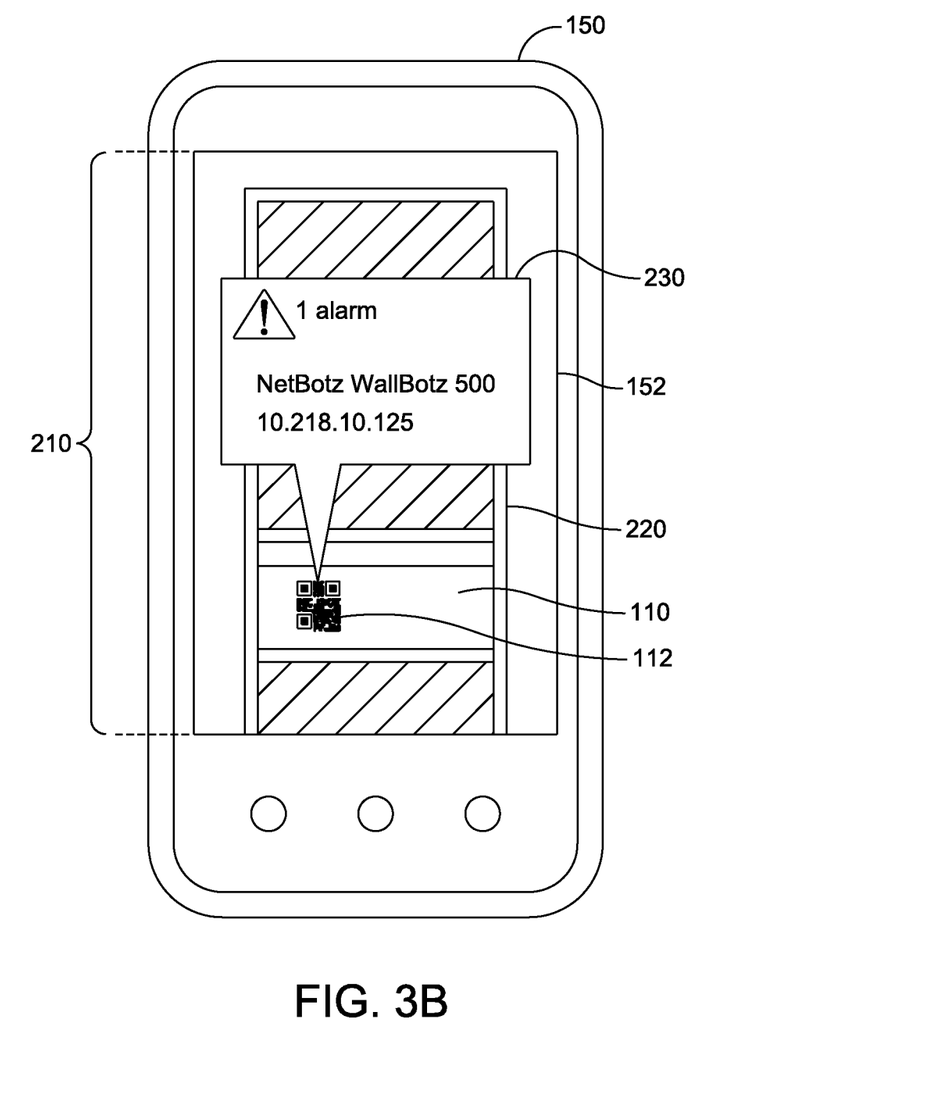
FIG. 3B illustrates yet another exemplary image displayed on the mobile computing device of FIG. 2.

In another embodiment, as shown in FIG. 3B, the status information may be superimposed over the captured image. The exemplary captured image 210 includes the fiduciary marker 112 and any other objects within the field of view of the camera, such as one hardware device 110 mounted in the equipment rack 220 with a fiduciary marker 112 affixed to the front panel.

The technique described above is a form of augmented reality, in which the user can physically move within the data center environment from one hardware device 110 to another, with camera of the mobile computing device 150 pointed at the respective fiduciary markers 112. As each fiduciary marker 112 comes into view of the camera, the status of the corresponding device, indicated at 210 in FIGS. 3A and 3B, is displayed on the screen 152 near the device itself. Although the status information is not physically present at or near the hardware device 110, the mobile computing device 150 enables the user to see the status information through the mobile computing device as if the status information were physically present before the user.

Figure 4:
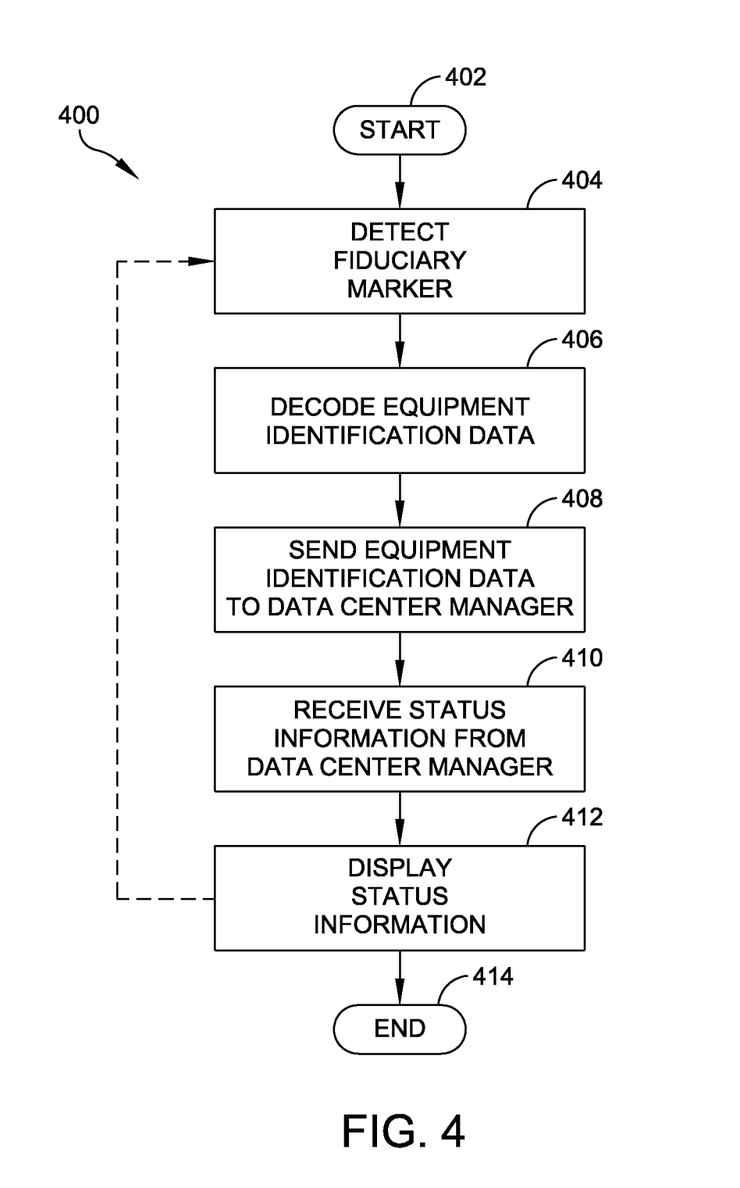
FIG. 4 is a flow diagram of a process of visualizing hardware status in accordance with one embodiment.

FIG. 4 is a flow diagram of a process 400 of visualizing equipment status information in accordance with one embodiment. Process 400 begins at block 402. At block 404, a fiduciary marker is detected within an image. The image may be captured, for example, by a camera in a smart phone or other mobile computing device. For instance, a user of the smart phone may approach a piece of equipment in a data center environment and take a photograph or live video of the piece of equipment and/or the surrounding environment.

If a fiduciary marker, such as a two-dimensional barcode (e.g., a QR code) appears within the image, the marker is detected by the process 400.

At block 406, once the fiduciary marker is detected, the data encoded in the marker is decoded. The data may include identification information for uniquely identifying the piece of equipment associated with the fiduciary marker. For example, the identification information may include an IP address assigned to the piece of equipment. At block 408, once the data is decoded, the data is sent to a data center manager or data center management system. The data may be sent, for example, over a wireless communication network, a wired communication network, or a combination of both.

The data center manager may process the data and return status information for the piece of equipment to the process 400. Thus, at block 410, the status information is received from the data center manager. Once the status information is received, at block 412, the status information is displayed, for example, on a display of the smart phone. In one embodiment, the status information is superimposed upon the image or video. The process 400 may return to block 404 and repeat each time a new image is captured or when the image within the video changes. For example, as the user moves about the data center and aims the camera at different fiduciary markers, the status information for each respective piece of equipment will be displayed on the smart phone.

In another embodiment, the user may use the smart phone to send commands to the piece of equipment. For example, once the piece of equipment is identified using the fiduciary marker, the smart phone may provide a user interface that enables the user to send a command, such as to reset an alert or to turn a power outlet on or off, to the respective piece of equipment. The command may pass through the data center manager, or be sent directly to the piece of equipment through the communication network.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, any type of fiduciary marker may be used in place of a one- or two-dimensional barcode. In another example, a positioning-based system (such as a Global Positioning System [GPS]) may be used instead of or in addition to the fiduciary marker. In this example, the mobile computing device determines its position within the data center and provides status information for one or more pieces of equipment that are nearby (e.g., within several meters). In another example, the mobile computing device may be configured to perform functions other than reporting equipment status, such as providing equipment control. Non-limiting examples of equipment control include resetting the device, clearing a fault, alert or warning message, setting, changing or deleting an alert/alarm/warning threshold value, and turning a power outlet on or off. Accordingly, the foregoing description and drawings are by way of example only.

What is claimed is:

1. A method of accessing equipment status information in a data center, the method comprising:
    detecting within the data center, by a mobile computing device, a first fiduciary marker affixed on or near a first piece of equipment within at least one image displayed on a display screen of the mobile computing device, the at least one image captured by an image capture device coupled to the mobile computing device, the first fiduciary marker configured to contain encoded first equipment identification data associated with the first piece of equipment;
    decoding, by the mobile computing device, the first equipment identification data from the first fiduciary marker;
    providing, by the mobile computing device, the first equipment identification data to a data center management system for the data center through a communications network;
    receiving, by the mobile computing device, status information that notifies a user of at least one of an alert and an alarm active for the first piece of equipment from the data center management system, responsive to providing the first equipment identification data to the data center management system, through the communication network; and
    superimposing the status information upon the at least one image displayed on the display screen of the mobile computing device.

2. The method of claim 1, wherein the first fiduciary marker includes a two-dimensional barcode.

3. The method of claim 1, wherein detecting within the data center, by a mobile computing device, further includes capturing a field of view of the image capture device that includes a video feed, the field of view including all visible objects and the first piece of equipment.

4. The method of claim 1, wherein superimposing the status information includes superimposing status information for the first piece of equipment, and further comprising sending, by the mobile computing device and through the communication network, a control command to the first piece of equipment.

5. The method of claim 1, wherein the first equipment identification data includes an Internet Protocol (IP) address of the first piece of equipment.

6. The method of claim 1, wherein the first equipment identification data includes a serial number of the first piece of equipment.

7. The method of claim 1, wherein the first equipment identification data includes a Media Access Control (MAC) address of the first piece of equipment.

8. The method of claim 1, wherein the first equipment identification data includes a hostname associated with the first piece of equipment.

9. The method of claim 1, wherein the first equipment identification data includes a model number of the first piece of equipment.

10. The method of claim 1, wherein the first equipment identification data includes a location of the first piece of equipment.

11. The method of claim 1, further comprising selecting the status information via a GUI, and receiving and displaying additional information.

12. The method of claim 1, wherein the at least one image includes a live video feed.

13. An apparatus for accessing equipment status information in a data center, the apparatus comprising:
    a camera; and
    a mobile computing device having a processor, a display screen and a wireless communication unit, the mobile computing device coupled to the camera and configured to receive at least one image captured by the camera;

the processor configured to:
  detect a first fiduciary marker within the at least one image, the first fiduciary marker affixed on or near a first piece of equipment and configured to contain encoded first equipment identification data associated with the first piece of equipment in the data center;
  decode the first equipment identification data from the first fiduciary marker;
  send the first equipment identification data to a data center management system for the data center using the wireless communication unit;
  receive first status information that notifies a user of at least one of an alert and an alarm active for the first piece of equipment from the data center management system, responsive to the first equipment identification data sent to the data center management system and decoded from the first fiduciary marker, using the wireless communication unit; and
  superimpose the first status information upon the at least one image displayed on the display screen.

14. The apparatus of claim 13, wherein the first fiduciary marker includes a two-dimensional barcode.

15. The apparatus of claim 13, wherein the at least one image includes a field of view of the image capture device, the field of view including all visible objects and the first piece of equipment.

16. The apparatus of claim 13, wherein the processor is further configured to superimpose the first status information and to send a control command to the first piece of equipment using the wireless communication unit.

17. The apparatus of claim 13, wherein the first equipment identification data includes at least one of an Internet Protocol (IP) address of the first piece of equipment, a serial number of the first piece of equipment, a Media Access Control (MAC) address of the first piece of equipment, a hostname associated with the first piece of equipment, a model number of the first piece of equipment, and a location of the first piece of equipment.

18. The apparatus of claim 13, wherein the processor is further configured to superimpose the first status information and to send a request for additional information pertaining to the first status information.

19. A computer readable medium comprising computer-executable instructions that when executed on a processor perform the acts of:
  detecting, within a data center, a first fiduciary marker within at least one image displayed on a display screen coupled to the processor, the at least one image captured by an image capture device coupled to the processor, the first fiduciary marker affixed on or near a first piece of equipment and configured to contain encoded first equipment identification data associated with the first piece of equipment;
  decoding the first equipment identification data from the first fiduciary marker;
  providing the first equipment identification data to a data center management system for the data center through a communications network;
  receiving first status information that notifies a user of at least one of an alert and an alarm active from the data center management system, responsive to the first equipment identification data provided to the data center management system, through the communication network; and
  superimposing the first status information upon the at least one image displayed on the display screen coupled to the processor.

20. The computer readable medium of claim 19, wherein the first fiduciary marker includes a two-dimensional barcode having hardware identification data encoded therein.

* * * * *